UNITED STATES PATENT OFFICE.

ADRIEN RALU, FILS, OF PARIS, FRANCE, ASSIGNOR TO HIMSELF, HORACE ALFRED BROWNE, OF NEW BRIGHTON, AND JOSEPH GRATHVOHL, OF PARIS, FRANCE.

PREPARING AND TREATING SIRUPS AND MOLASSES.

SPECIFICATION forming part of Letters Patent No. 335,240, dated February 2, 1886.

Application filed August 24, 1885. Serial No. 175,227. (No specimens.) Patented in France May 9, 1885, No. 156,218, and in England July 23, 1885, No. 8,924.

*To all whom it may concern:*

Be it known that I, ADRIEN RALU, Fils, distiller, a citizen of the Republic of France, and residing at 21 Rue Condorcet, Paris, in the said Republic, have invented certain Improvements in Preparing and Treating Sirups and Molasses, especially those of sorgho and sugar-cane, by mixing them with substances adapted for distillation and in the manufacture of spirit therefrom, (for which I have obtained a patent in France No. 156,218, dated 9th May, 1885, and for which I have applied for a patent in Great Britain, No. 8,924, on the 23d July, 1885,) of which the following is a specification.

Hitherto it has not been possible to transport from the place of production the sirups or molasses intended to be used in the manufacture of spirit otherwise than in a liquid state in barrels.

I have found a method of transporting sirups and molasses, especially those of sorgo (*Andropogon saccharatus*) and sugar-cane, in a solid form by mixing them with substances which are themselves fit for distillation, and are rich in alcohol of a superior quality, thereby producing a new material for the use of distillers in the manufacture of spirits.

In carrying out my invention the juice of sugar-cane, sorgo, or other sacchariferous substance, having been reduced to a consistent sirup by means of boiling and evaporation, is mixed in a boiler with an equal quantity of some farinaceous, feculent, or amylaceous matter—such as the flour or fecula of the sweet-potato, couscouche, manioc, esculent arum, bread-fruit, &c. The two substances are incorporated slowly by being constantly stirred, either by a mixer fixed in the boiler or by a flat shovel adapted for the purpose. When the mass has become quite homogeneous, it is poured out into metal molds. As soon as cold the bolts are removed and the contents of the molds will be found to be a solidified mass, which can be packed in canvas or wood and transported as required. The same process applies when treacle or molasses is substituted for the juice. I may also proceed as follows: With a certain quantity of either sirup, treacle, or molasses is mixed an equal quantity either of the fresh raspings of sweet-potato, couscouche, manioc, esculent arum, or other similar root, or of some farinaceous, feculent, or amylaceous matter, or the coarse meal of maize, rice, or other grain, provided always, that such root or grain is adapted for distillation purposes. The two substances are mixed and amalgamated by heat until the aqueous particles contained in the vegetable substances are evaporated. The residue is then poured into molds, as above described.

The advantages obtained are that the sirups, molasses, &c., are thus rendered easy of transport. Instead of being placed in expensive casks, they can be packed in mats or sacking. The cost of their freight will be diminished, and in some countries they will escape the custom duties now imposed on unsophisticated sirup. The storage also of these blocks in distilleries is much easier and less expensive than that of liquid sirups or molasses, which require reservoirs of large dimensions.

To treat the solidified blocks, I proceed as follows: I soak the blocks in warm water, below 45° to 50° centigrade, (113° to 120° Fahrenheit.) They are then left to settle. The sweet and liquid portion is poured off and then fermented. The matter deposited is washed with water and allowed to settle again. The water is used again to wash other blocks. As to the deposit of farinaceous or feculent matter, it is soaked in water in the proportion of eleven pounds of solid matter to twenty-two gallons of water. I add then from five and one-half pounds to six and one-fourth pounds of the chlorohydric or sulphuric acid of commerce to twenty-two gallons of the produce. This is boiled for ten hours in a boiler. The acid is then neutralized by carbonate of lime, and fermentation set up in the mass. The amount of yeast is the same as when treating grain. The product in the state of phlegm or vinasse is then distilled by ordinary distilling apparatus.

Having now particularly described and ascertained the nature of my said invention, and in what manner the same is to be performed, I declare that what I claim is—

1. Preparing or treating sirups or molasses for transport by mixing them with a solidifying substance or substances adapted for distilling and forming the compound into masses or blocks, substantially as hereinbefore described.

2. As a new manufacture masses or blocks made by mixing sirups or molasses with a solidifying substance adapted for distilling, substantially as hereinbefore described.

3. The manufacture of alcohol by taking compounds, masses, or blocks, prepared as hereinbefore described and claimed, and treating the same by means of a liquid and distillation, substantially as hereinbefore described.

In testimony whereof I have signed my name to this specification in the presence of two subscribing witnesses.

ADRIEN RALU, FILS.

Witnesses:
J. GRATHVOHL,
　13 *Rue Fenelon*,
H. DUFOUR,
　59 *Rue Lafayette*.